Aug. 4, 1936.  A. G. MARSH  2,049,918
BALANCING WEIGHT
Filed June 19, 1934   2 Sheets-Sheet 1
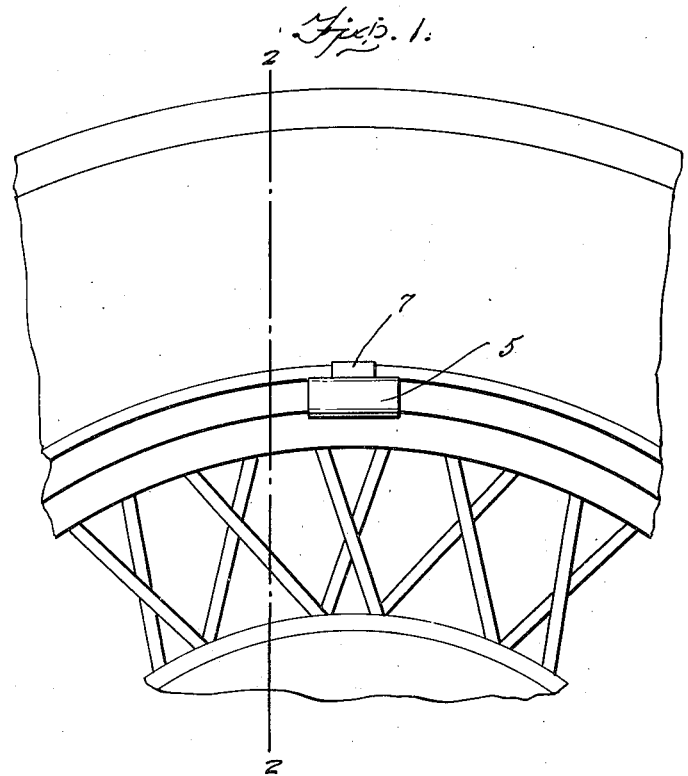
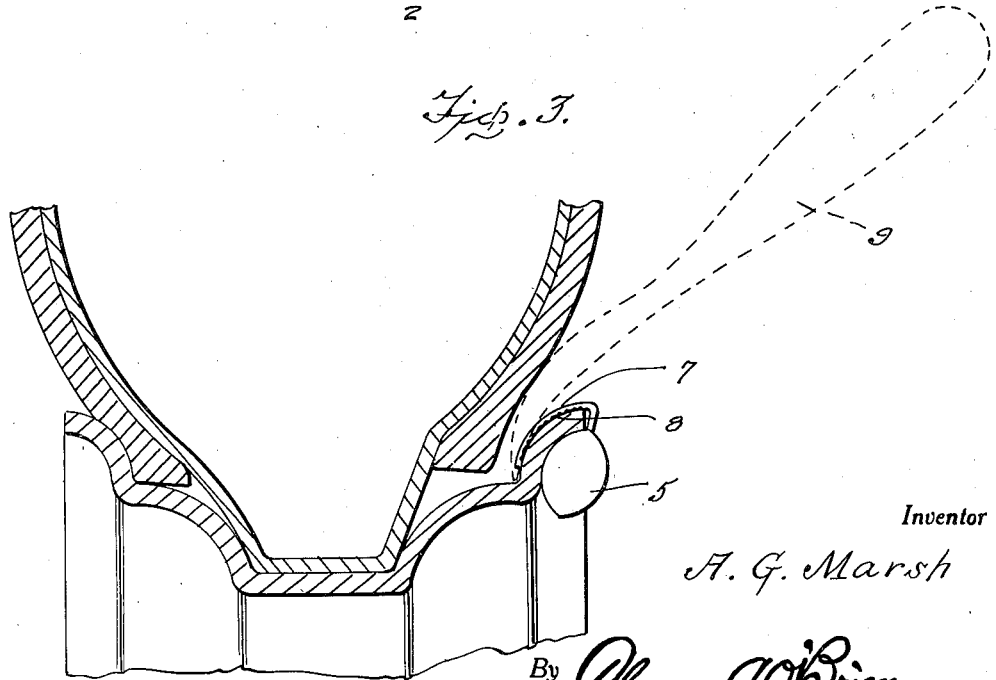
Inventor
A. G. Marsh
By Clarence A. O'Brien
Attorney Aug. 4, 1936.   A. G. MARSH   2,049,918
BALANCING WEIGHT
Filed June 19, 1934   2 Sheets-Sheet 2
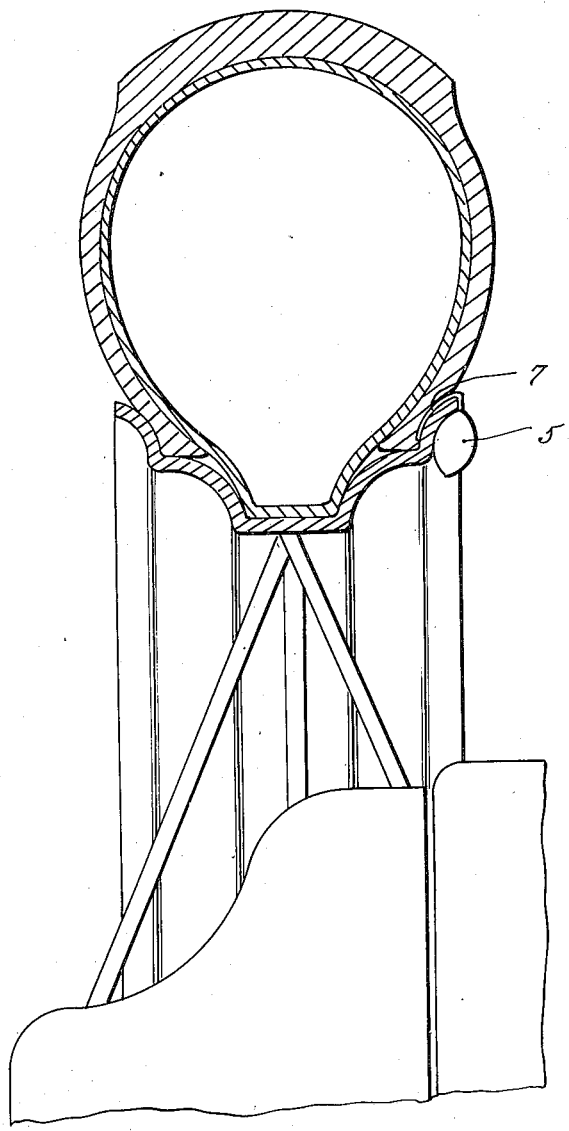
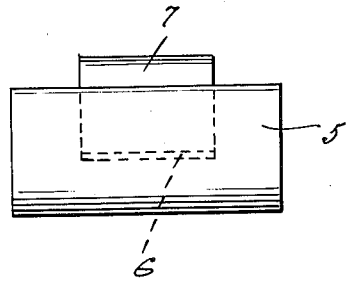
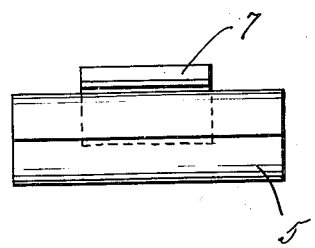
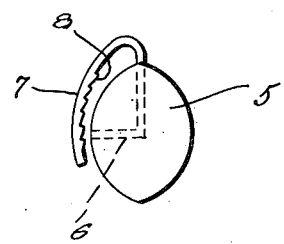
Inventor
A. G. Marsh
By Clarence A. O'Brien
Attorney

Patented Aug. 4, 1936

2,049,918

UNITED STATES PATENT OFFICE 2,049,918

BALANCING WEIGHT

Austin G. Marsh, Pueblo, Colo.

Application June 19, 1934, Serial No. 731,313

1 Claim. (Cl. 301—5)

The present invention relates to a balancing weight for an automobile wheel or the like and has for its object to provide means whereby a wheel may be correctly balanced to overcome defects in the proper balance of the wheel.

Another important object of the invention resides in the provision of a balance weight of this nature which is exceedingly simple in its construction, inexpensive to manufacture, easy to install on the wheel, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a fragmentary side elevation of a wheel showing one of my weights in place.

Figure 2 is a sectional view taken substantially on the line 2—2 of Figure 1.

Figure 3 is a somewhat similar view indicating in dotted lines a tool used in the installation of the weight.

Figure 4 is a detail side elevation of the weight.

Figure 5 is a top plan view thereof.

Figure 6 is an end elevation thereof.

Referring to the drawings in detail, it will be seen that the numeral 5 denotes a block-like oblong body weight of lead which is oval in end elevation. In the center of this body an L-shaped lug 6 is embedded and anchored and one end of said lug protrudes from the body and merges into a curved shank 7 following somewhat, and yet eccentrically, the curvature of the adjacent surface of the body, and having its inner surface roughened as indicated at 8. It may be necessary to use a plurality of these balancing weights on a wheel. The wheel is removed complete with brake drum and is mounted on a balancing stand with brake drum out. A test for out-of-roundness is then made and the weight or weights are then mounted as may be needed by the use of a prying tool 9 as indicated to advantage in Figure 3 so that the arcuate shank 7 is disposed between the flange on the rim of the wheel adjacent the bead of the tire.

The shank 7 has a certain amount of flexibility and this flexibility permits the weight to be clipped to the rim instantly, in the shifting and arrangement of the weight in order to find the proper final location thereof. The flexibility of the lug also permits it to automatically conform in shape to suit slight variations in shape of rim flanges which may occur in wheels of various makes.

Other advantages of my type of balancing weight are: It does not distort the bead of the tire; does not project appreciably beyond the rim radially, hence a car may ride smoothly on a flat tire, without injury to tire, tube or balance weight; will not be thrown off a rim even when tire is flat; leaves a slight imprint mark on the bead of the tire permitting it to be instantly placed in its proper location when reassembling after repairing a flat tire; entire balancing operation may be done without removing wheel from car, providing the wheel runs free on its spindle. The proper locations may be found by shifting and arranging on the outside of the wheel and the locations marked. The weights may then be finally placed on the brake drum side, by merely deflating tire sufficiently to permit the insertion of the lug. It will also be apparent that by reason of the body being of lead, and the arrangement whereby the flexible shank is secured in and by the material of the body, the weight is exceedingly simple and inexpensive and yet is adapted to meet all of the requirements necessary in such a device.

It is thought that the construction, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A balancing weight for an automobile wheel or the like, comprising an elongated body of oval form in cross section tapered to opposite longitudinal edges, an L-shaped lug embedded and secured of itself in said body and having one of its ends substantially flush with one side of the body and its opposite end protruding through and beyond one of the said edges of the body, and a curved flexible shank into which the protruding end of said lug merges, said shank extending alongside the said side of the body with its concave face opposed thereto and spaced therefrom and the outer end of the shank being free and the space between body side and shank being diminished in width toward the free end of the shank.

AUSTIN G. MARSH.